(12) United States Patent
Alarcon et al.

(10) Patent No.: US 12,463,937 B2
(45) Date of Patent: Nov. 4, 2025

(54) METHOD FOR CONFIGURING A COMMUNICATION NETWORK AND NODE IMPLEMENTING SAID CONFIGURATION METHOD

(71) Applicant: SAGEMCOM BROADBAND SAS, Rueil Malmaison (FR)

(72) Inventors: Laurent Alarcon, Rueil Malmaison (FR); Stanislas Faye, Rueil Malmaison (FR); Massinissa Lalam, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 217 days.

(21) Appl. No.: 17/993,171

(22) Filed: Nov. 23, 2022

(65) Prior Publication Data
US 2023/0171226 A1 Jun. 1, 2023

(30) Foreign Application Priority Data
Nov. 26, 2021 (FR) ........................................ 2112595

(51) Int. Cl.
*H04L 61/5014* (2022.01)
*H04L 12/66* (2006.01)
*H04L 61/5046* (2022.01)

(52) U.S. Cl.
CPC .......... *H04L 61/5014* (2022.05); *H04L 12/66* (2013.01); *H04L 61/5046* (2022.05)

(58) Field of Classification Search
CPC ..... H04L 12/66; H04L 41/0663; H04L 45/22; H04L 45/28; H04L 61/103; H04L 61/5014; H04L 61/5046; H04L 2101/622; H04W 40/02; H04W 40/22
See application file for complete search history.

(56) References Cited

U.S. PATENT DOCUMENTS

| | | | |
|---|---|---|---|
| 7,152,179 B1 * | 12/2006 | Critchfield | H04L 45/28 714/4.11 |
| 7,881,208 B1 * | 2/2011 | Nosella | H04L 61/103 370/242 |
| 10,630,543 B1 * | 4/2020 | Wei | H04L 61/5014 |

(Continued)

OTHER PUBLICATIONS

Jun. 8, 2022 Search Report issued in French Patent Application No. 2112595.

(Continued)

*Primary Examiner* — Vivek Srivastava
*Assistant Examiner* — William C McBeth
(74) *Attorney, Agent, or Firm* — Williams Mullen; R. Brian Drozd

(57) ABSTRACT

A method for configuring a communication network including a gateway adapted for connecting the communication network to a wide area communication network and connected to a plurality of nodes implementing an access point functionality is described. The nodes are coordinated in a centralised manner by a current master node selected from the plurality of nodes. The current master node obtains a virtual MAC address and an IP address associated with the virtual MAC address, the IP address being reserved for configuring network services. It next configures a virtual network interface from the IP address associated with the virtual MAC address.

7 Claims, 3 Drawing Sheets

(56) References Cited

U.S. PATENT DOCUMENTS

| | | | | |
|---|---|---|---|---|
| 2003/0069993 | A1* | 4/2003 | Na | H04L 61/5014 |
| | | | | 709/230 |
| 2007/0043771 | A1* | 2/2007 | Ludwig | H04L 61/457 |
| 2008/0294759 | A1* | 11/2008 | Biswas | H04L 61/5092 |
| | | | | 726/4 |
| 2009/0086743 | A1* | 4/2009 | Veits | H04L 45/28 |
| | | | | 370/401 |
| 2014/0280947 | A1* | 9/2014 | Christopher | H04L 41/0895 |
| | | | | 709/226 |
| 2016/0248729 | A1 | 8/2016 | Cui et al. | |
| 2020/0204518 | A1* | 6/2020 | Colliaux | H04L 61/5014 |
| 2021/0377165 | A1* | 12/2021 | Albrecht | H04L 61/5014 |

OTHER PUBLICATIONS

Hinden, R., et al., "Virtual Router Redundancy Protocol (VRPR)", Network Working Group, The Internet Society, Apr. 2004.

Li, T., et al., "Cisco Hot Standby Router Protocol (HSRP)", Network Working Group, The Internet Society, Mar. 1998.

* cited by examiner

METHOD FOR CONFIGURING A COMMUNICATION NETWORK AND NODE IMPLEMENTING SAID CONFIGURATION METHOD

TECHNICAL FIELD

At least one embodiment relates to a method for configuring a communication network comprising a gateway adapted for connecting the communication network to a wide area communication network and connected to a plurality of nodes implementing the access point functionality, said nodes being coordinated in a centralised manner by a current master node selected from the plurality of nodes. At least one other embodiment relates to a node implementing said configuration method.

PRIOR ART

In order to increase the range of local area networks LAN, coordinating a plurality of access points AP is known. These various access points AP are incorporated in interconnected communication nodes, simply referred to hereinafter as nodes. All these access points AP make available one and the same wireless local area network WLAN. In the context of Wi-Fi (registered trade mark) technology, all these access points AP thus use one and the same SSID identifier ("Service Set IDentifier") and one and the same password (also referred to as a security key). Thus the extension of wireless communication coverage is transparent for the devices connected to the wireless local area network WLAN.

The local area network is thus typically connected to the internet through a gateway GW for access to the internet, for example by means of an Ethernet lead providing the connection of a principal node of the wireless local area network with the gateway GW. The nodes of the network thus serve as relays between the gateway and each device connected by cable or wireless to the local area network LAN, and also serve as relays between these various devices connected to the local area network LAN to enable them to communicate with one another.

The nodes of the local area network are connected to one another by a structure in tree form, a node then being able to serve as a relay between two other nodes. The nodes are thus interconnected by means of cable connections, for example of the Ethernet type, or by wireless connections, for example a Wi-Fi (registered trade mark) connection using an SSID identifier different from said local area network WLAN itself. The nodes of the local area network thus communicate with one another by means of logic links, for example IP communications or encrypted tunnels or communications in accordance with a proprietary communication protocol. These logic links are typically established by means of probe and discovery messages.

The nodes of the network are typically coordinated in a centralised manner by a master node selected from said nodes of the network. The master node can be designated by fixed configuration or dynamically by election, i.e. using information such as a serial number, an identifier of the version of the software installed in the node, or by relying on DHCP (the English acronym of "Dynamic Host Configuration Protocol") options. All the nodes of the network thus have knowledge of the master node, and are capable of identifying it by means of its MAC address (the English acronym of "Medium Access Control").

In the case of the local area networks LAN at subscribers of an internet access provider, the master node is preferentially the node of the network that is closest to the gateway GW. This makes it possible to specifically host network services therein, such as for example a DNS (the English acronym of "Domain Name System") service, a parental control service or a routing service, since the master node then has a strategic position of concentrating data streams while being the node or one of the nodes of the local area network closest to the GW gateway. To access the various services, all the nodes connected to the local area network are conventionally configured with the IP address of the master node.

However, when there is a change of master node, e.g. following a loss of connection between the master node and the gateway, the other nodes also lose their connection to the local area network and more generally access to the network services. This is because the configuration of the nodes for access to the various network services with the IP address of the previous master node is no longer valid following the change of master node. The result is an interruption of said network services, which are no longer accessible to the users of the local area network.

It is desirable to overcome these various drawbacks of the prior art. It is in particular desirable to propose a method for configuring a communication network that allows continuity of access to the network services, in particular in the case of a change of master node.

DISCLOSURE OF THE INVENTION

At least one embodiment relates to a method for configuring a communication network comprising a gateway adapted for connecting the communication network to a wide area communication network and connected to a plurality of nodes implementing an access point functionality. The nodes are coordinated in a centralised manner by a current master node selected from the plurality of nodes. The method comprises the following steps implemented by the current master node:
  obtaining a virtual MAC address and an IP address associated with said virtual MAC address, said IP address being reserved for a configuration of network services; and
  configuring a virtual network interface with the IP address associated with said virtual MAC address.

By means of the use of a virtual MAC address and an IP address reserved for a configuration of the network services, the configuration method advantageously enables the nodes of the network to continue to benefit from access to the network services, in particular following a change of master node.

In a particular embodiment, obtaining a virtual MAC address and an IP address associated with said virtual MAC address comprises:
  generating a virtual MAC address from a base MAC address of said current master node;
  configuring the virtual network interface with said virtual MAC address;
  starting up a DHCP client connected to the virtual interface;
  obtaining, by the DHCP client, an IP address from a DHCP server, said IP address obtained being the IP address reserved for the configuration of the network services.

In a particular embodiment, the value of said virtual MAC address is equal to the value of said base MAC address of said current master node incremented by v, v being a positive integer.

In a particular embodiment, obtaining a virtual MAC address and an IP address associated with said virtual MAC address comprises receiving said virtual MAC address and said IP address associated with said virtual MAC address from another node of the network, said IP address having been obtained, from a DHCP server, by another master node different from said current master node from a virtual MAC address, said virtual MAC address having been generated from a base MAC address of said other master node and wherein configuring a virtual network interface with the IP address associated with said virtual MAC address comprises configuring said virtual network interface with said virtual MAC address and with the IP address associated with said virtual MAC address and starting up a DHCP client connected to the virtual interface.

In a particular embodiment, configuring a virtual network interface with the associated IP address comprises creating a secondary routing table and using said secondary routing table for redirecting the traffic of the network services received.

At least one embodiment relates to a master node of a communication network comprising a gateway adapted for connecting the communication network to a wide area communication network and connected to a plurality of nodes implementing an access point functionality. The nodes are coordinated in a centralised manner by the master node. The master node comprises:

means for obtaining a virtual MAC address and an IP address associated with said virtual MAC address, said IP address being reserved for a configuration of network services; and means for configuring a virtual network interface with the IP address associated with said virtual MAC address.

The master node is configured for implementing the method according to any one of the preceding embodiments.

At least one embodiment relates to a computer program product that comprises instructions for implementing the configuration method according to any one of the preceding embodiments when said program is executed by a processor.

At least one embodiment relates to a storage medium that stores a computer program comprising instructions for implementing the configuration method according to any one of the preceding embodiments, when said program is executed by a processor.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
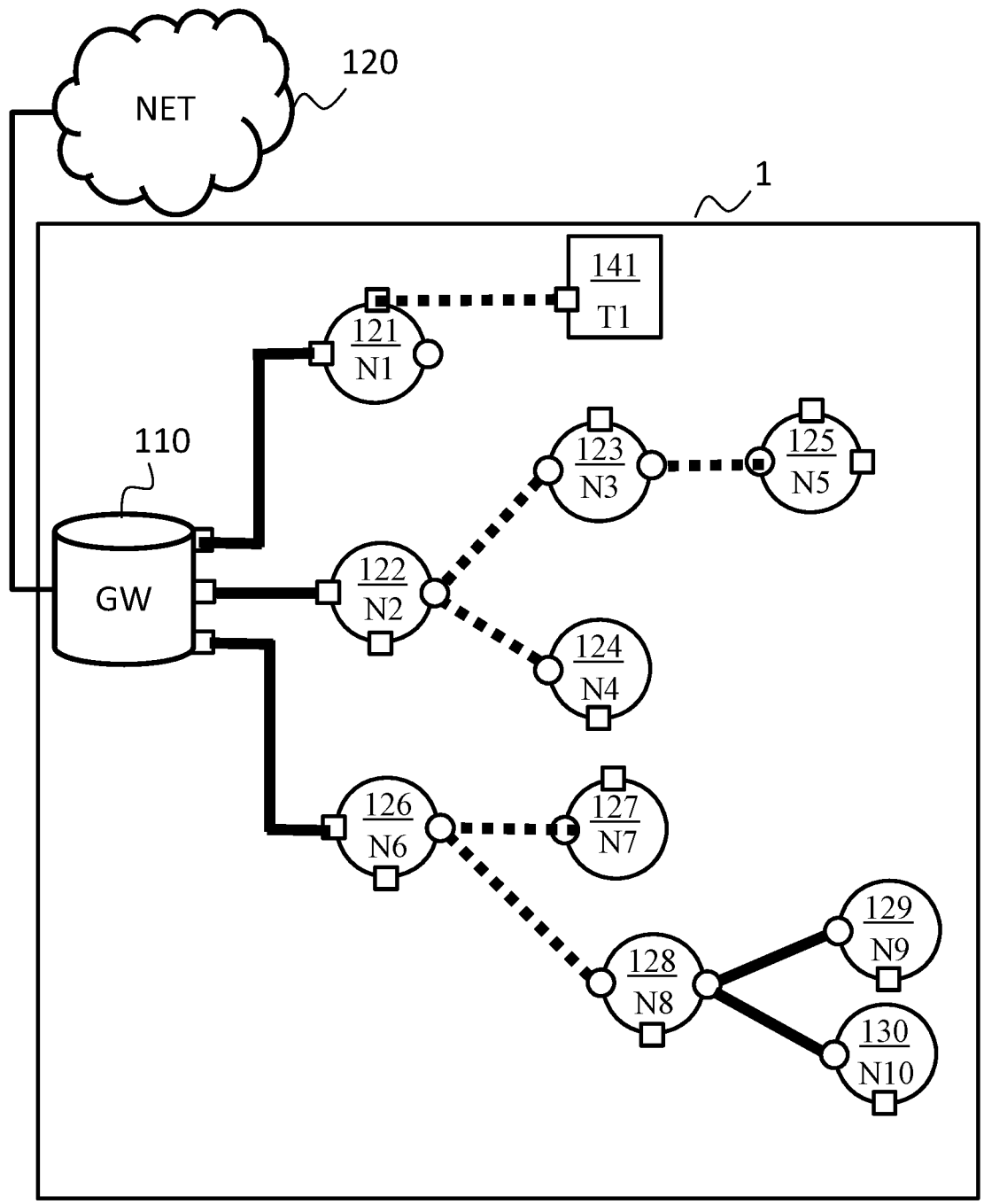
FIG. 1 illustrates schematically a communication network wherein the present invention can be implemented.

FIG. 1 illustrates schematically a communication network 1 wherein the present invention can be implemented. The communication network 1 comprises a set of nodes N1 121, N2 122, N3 123, N4 124, N5 125, N6 126, N7 127, N8 128, N9 129 and N10 130 interconnected and connected to a wide area communication network 120, e.g. to the internet, through a gateway GW 110. Each node implements an access point functionality AP of a wireless local area network WLAN. The nodes of said plurality of nodes all make available one and the same wireless local area network WLAN (same name etc.). In the context of Wi-Fi (registered trade mark) technology, all these access points AP thus use one and the same identifier SSID and one and the same password, to form a mesh wireless network. The coverage area of the wireless local area network WLAN thus formed around the communication network 1 is then extended transparently for each terminal, or station, that connects thereto.

The nodes N1 121 to N10 130 are connected to one another by means of a structure in tree form, a node then being able to serve as a relay between two other nodes. In one example, when a distinction is made between a backhaul access point functionality (for interconnecting the nodes) and a fronthaul access point functionality (for connecting equipment or stations to the LAN), the nodes N1 121 to N10 130 are interconnected by means of cable connections, for example of the Ethernet type, or by wireless connections, for example a Wi-Fi (registered trade mark) connection using an SSID identifier different from said wireless local area network WLAN itself. In another example, when nodes support both the backhaul and fronthaul functionalities, the interconnection of the nodes and the connection of the stations can use one and the same SSID. The nodes N1 121 to N10 130 of the communication network 1 thus communicate with one another by means of logic links, for example IP communications or encrypted tunnels or communications in accordance with a proprietary communication protocol.

By way of illustration, on FIG. 1, the nodes N1 121, N2 122 and N6 126 are connected directly to a gateway GW 110. The branches of the communication network 1 connected to these nodes N1 121, N2 122 and N6 126 have a star or daisy chain topology. FIG. 1 also shows that the node N2 122 is connected to the node N3 123 and to the node N4 124 by means of a wireless connection (distinct from the wireless local area network WLAN itself) represented by a broken line, and the nodes N9 129 and N10 130 are connected to the node N8 128 by means of a cable connection represented by a solid line. The node N5 125 is connected to the node N3 123 by means of a wireless connection. The node N6 126 is connected to the node N7 127 and to the node N8 128 by means of a wireless connection.

The communication network 1 thus makes it possible to connect the gateway GW 110 to one or more terminals, e.g. the terminal T1 141. The terminal T1 141 is for example a smartphone connected by a wireless connection, a television set connected by a cable connection, a tablet connected by a wireless connection, a network storage unit NAS ("Network Attached Storage") connected by a wireless connection.

The configuration of the communication network 1 is defined through a master node selected from the plurality of nodes. In a particular embodiment, the master node is selected from the nodes that are directly connected to the gateway GW 110, namely one of the nodes N1 121, N2 122 or N6 126 in the context of FIG. 1. The nodes that are not masters are said to be slave nodes.

All the nodes of the communication network I have knowledge of all the other nodes of the communication network 1 and are capable of identifying them by means of their base MAC addresses, i.e. the MAC address attributed when it was manufactured in the factory, and/or their network addresses (e.g. IP addresses). This is because all the nodes of the communication network 1 have an IP address. This IP address is attributed to them by a DHCP server (the English acronym of "Dynamic Host Configuration Protocol") conventionally embedded in a router, e.g. located in the gateway.

The DHCP server delivers IP addresses to the nodes that request them via a DHCP client, e.g. using the IPV4 or IPv6 protocol. More precisely, the DHCP server provides an IP lease (attribution of an IP address) as defined by the normative document RFC 1531, amended and supplemented by the normative documents RFC 1534, RFC 2131 and RFC 2132. An IP lease generally comprises an IP address and a period of validity. Conventionally, an IP address is attributed by broadcasting by the node of a request of the DHCPDISCOVER type for locating a server of the DHCP type. The request of the DHCPDISCOVER type comprises the physical address (or MAC address) of the node. The DHCP server receives the DHCPDISCOVER message. In response, it sends a response of the DHCPOFFER type, i.e. an IP lease offer, which comprises in particular the IP address of the DHCP server, as well as the IP address that it is offering to the node. In general, the node will then send a DHCPREQUEST message by which it selects an IP lease offer. The DHCPREQUEST message comprises the identification of the DHCP server selected. The DHCP server selected sends an acknowledgement message DHCPACK. The DHCP messages may contain DHCP options that provide configuration and service information specific to the DHCP clients. These options appear in the form of fields of variable length at the end of the DHCP messages that the DHCP servers and clients exchange. For example, one option may be used for listing the DNS servers available.

Each node of the communication network 1 is able to use specific functionalities of a network service according in particular to its role (master or slave) in the communication network 1. The functionalities used are DNS (the English acronym of "Domain Name System") relay functionalities, DHCP (the English acronym of "Dynamic Host Configuration Protocol") relay functionalities, firewall functionalities with regard to data flows exchanged via the internet through the gateway GW 110, and/or parental control functionalities with regard to data flows exchanged via the internet through the gateway GW 110. A node implementing the DHCP relay functionality can relay IP address request broadcasts of DHCP clients to a DHCP server. A node implementing the DNS relay functionality can relay domain name resolution requests to a DNS server.

Figure 2:
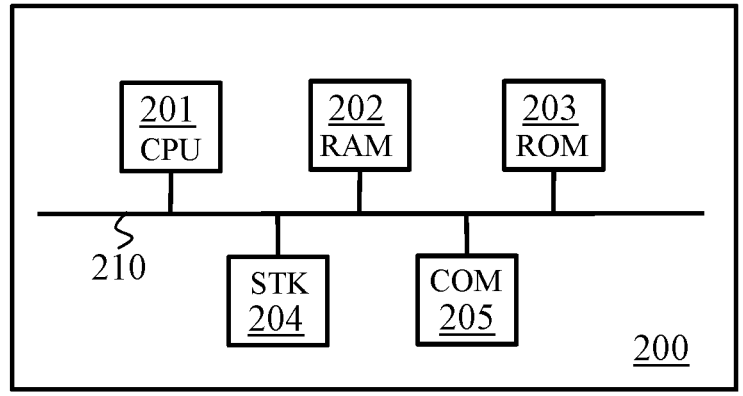
FIG. 2 illustrates schematically an example of hardware architecture of a node of the communication network according to a particular embodiment.

FIG. 2 illustrates schematically an example of hardware architecture of a node 200 of the communication network 1 according to a particular embodiment.

According to the example of hardware architecture shown in FIG. 2, the node 200 comprises, connected by a communication bus 210: a processor or CPU (central processing unit) 201; a random access memory RAM 202; a read only memory ROM 203 and/or a flash memory; a storage unit 204 such as a hard disk or such as a storage medium reader, e.g. an SD (Secure Digital) card reader; and at least one communication interface COM 205. At least one communication interface COM 205 makes it possible to implement the access point AP functionality.

The processor CPU 201 is capable of executing instructions loaded in the RAM memory 202 from the ROM memory 203, from an external memory (not shown), from a storage medium (such as an SD card), or from a communication network. When powered up, the processor CPU 201 is capable of reading instructions from the RAM memory 202 and executing them. These instructions form a computer program causing the implementation, by the processor CPU 201, of all or some of the methods described below in relation to FIGS. 3 and 4.

Figure 3:
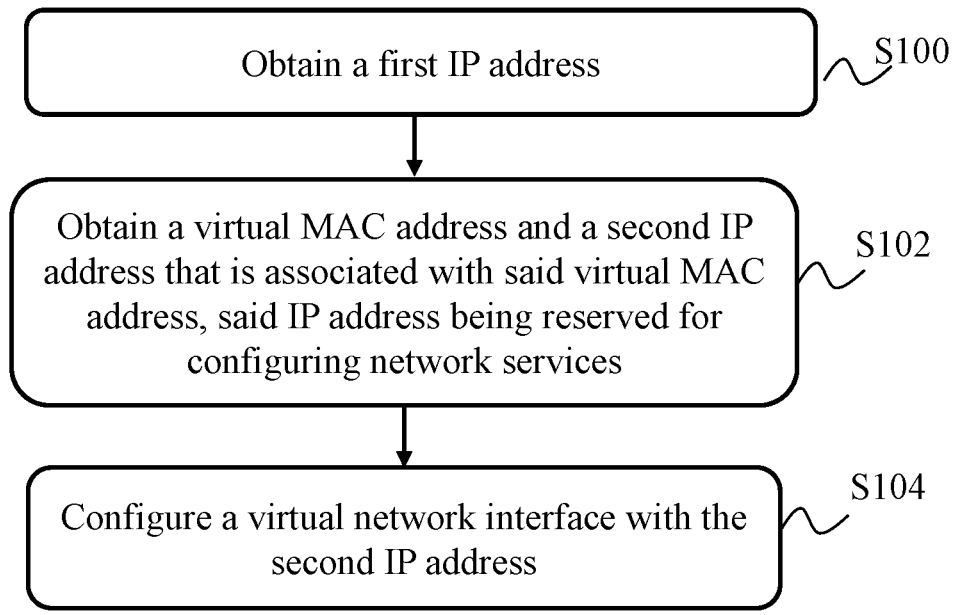
FIG. 3 illustrates schematically a method for configuring a communication network according to a particular embodiment.
Figure 4:
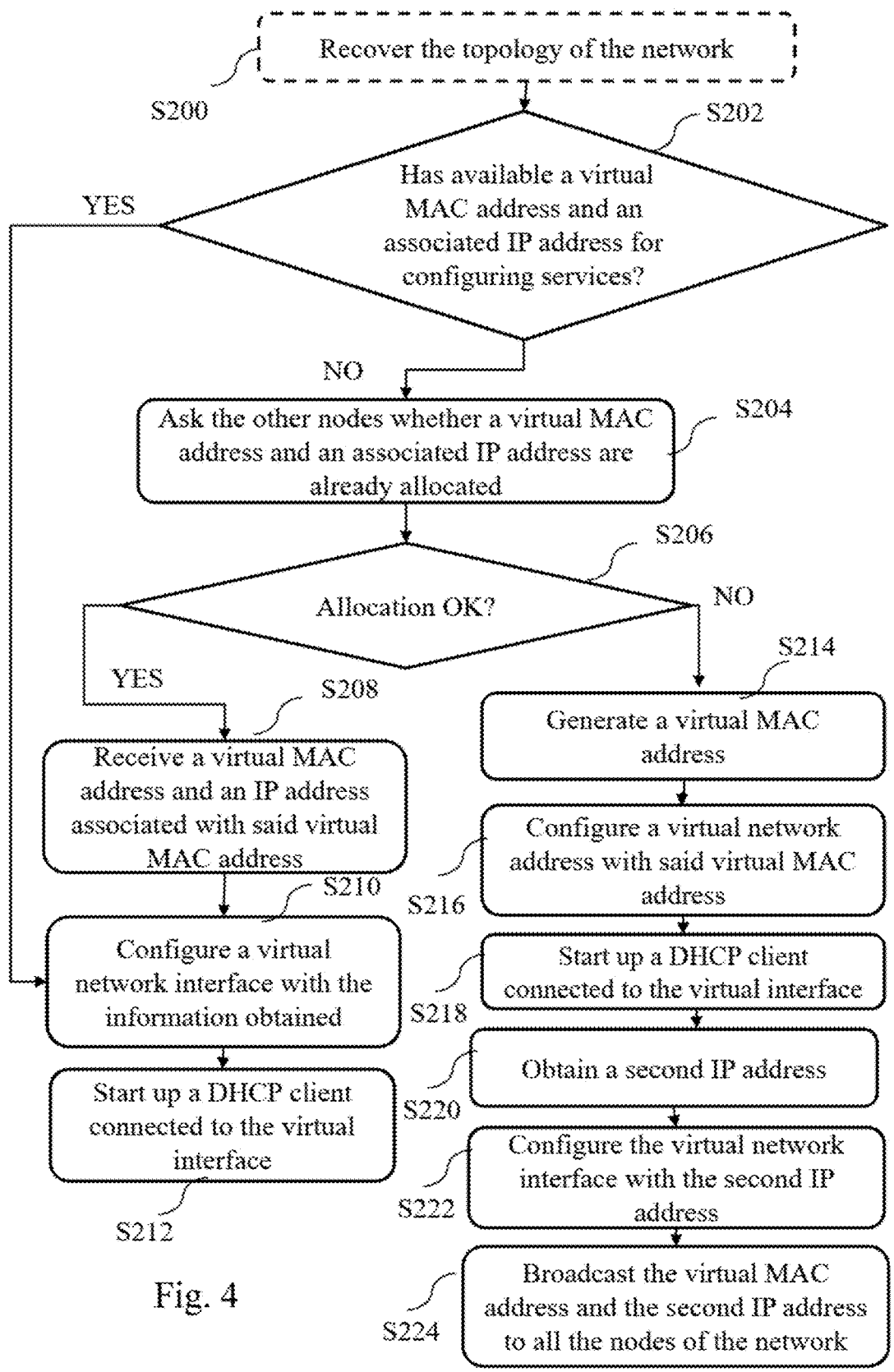
FIG. 4 illustrates schematically a method for configuring a communication network according to a particular embodiment.

All or some of the methods described in relation to FIGS. 3 and 4 can be implemented in software form by executing a set of instructions by a programmable machine, such as a DSP (digital signal processor) or a microcontroller or a processor. All or some of the methods described below can also be implemented in hardware form by a machine or a dedicated component, such as an FPGA (field-programmable gate array) or an ASIC (application-specific integrated circuit). Thus the nodes N1 121 to N10 130 comprise electronic circuitry configured for implementing all or some of the methods described in relation to FIGS. 3 and 4.

FIG. 3 illustrates schematically a method for configuring a communication network 1 according to a particular embodiment. The method is implemented by a master node.

In a step S100, the master node obtains a first IP address from the DHCP server from its base MAC address, which is attributed at the time of manufacture in the factory. This base MAC address, which is unique, serves to identify the master node. In order to dissociate the network services of the master node, the nodes connected to the local area network are not configured with this first IP address of the master node, unlike what is done in the methods of the prior art. For example, this first IP address is used by the master node for communicating with the other nodes via the communication bus, e.g. for synchronising Wi-Fi parameters with each other and/or propagating events such as changes of topology. In another example, this first IP address is used by the master node for its own requirements: access to the wide area communication network 120, updating its management firmware, remote monitoring, etc.

In a step S102, the master node obtains a virtual MAC address and a second IP address that is associated with said virtual MAC address. This second IP address, which is different from the first IP address, is reserved for configuring network services. For this purpose, the master node deceives the DHCP server by making it believe that the second IP address is being requested by a device different from the master node that has already obtained the first IP address in the step S100. To do this, the master node obtains a virtual MAC address that is generated from its base MAC address. The MAC address is said to be virtual since it is not a base MAC address identifying a network device as from the manufacture thereof in the factory but an address generated from a base MAC address. For example, the virtual MAC address is obtained by incrementing the base MAC address by a value v, e.g. v=1. In a variant embodiment, the virtual MAC address is obtained by positioning a private bit of the MAC address at a predefined value, e.g. at the value 1. Such a private bit is defined in the document RFC 1649.

In a particular embodiment, the master node configures a virtual interface with said virtual MAC address and starts up a DHCP client connected to the virtual interface in order to obtain the second IP address from a DHCP server. This virtual interface is configured for hosting the network services, e.g. DNS, routing, etc. For example, the following Linux command is used for configuring this virtual interface:

ip link add link br0 name br0.service type macvlan
   where br0 is a bridge defined for connecting all the LAN
      interfaces to each other, and br0.service is the name of the virtual interface used for hosting the network services. Thus a link is created between br0 and the virtual interface br0.service. macvlan indicates that br0.service is a virtual interface based on a MAC address.

The virtual interface is next configured with the virtual MAC address, for example by means of the following Linux command:

ifconfig br0.service hw ether <virtual mac address>

To obtain the second IP address, the master node broadcasts a request of the DHCPDISCOVER type for locating a server of the DHCP type. The request of the DHCPDISCOVER type comprises the virtual MAC address of the node. For example, the virtual MAC address is inserted in a field chaddr of the request. In a variant, the virtual MAC address is inserted in an optional field of the request known by the English terminology Client Identifier. This field is in particular defined in the normative document RFC 1541. In a variant embodiment, the field Client Identifier is based on the virtual MAC address without being equal to said virtual MAC address. In another variant embodiment, the field Client Identifier comprises the serial number. The DHCP server receives the message DHCPDISCOVER. Thinking that it is a case of a new node the base MAC address of which is the virtual MAC address generated, it sends a response of the DHCPOFFER type, i.e. an IP lease offer, which comprises in particular the IP address of the DHCP server, as well as the second IP address that it is offering to the master node. This second IP address is different from the first IP address. In general, the master node will then send a message DHCPREQUEST by which it selects an IP lease offer. The message DHCPREQUEST comprises the identification of the DHCP server selected. The DHCP server selected sends an acknowledgement message DHCPACK, which may in particular contain the address of a DNS server (the English acronym of "Domain Name System").

In a step S104, the master node configures the virtual network interface with the second IP address. The virtual interface is configured with the second IP address, for example by means of the following Linux command:

ip addr add <second IP address>dev br0.service

Each node of the communication network 1 has its own routing table that enables it to route the traffic, in this case network frames, to their destination.

Then the route of the bridge br0.service is inserted in a secondary routing table, the number of which is selected arbitrarily. For example, the following Linux command is used:

ip route add <network br0.service>table 10. In this case, the secondary routing table bears the number 10.

Routing rules are next inserted for redirecting the traffic of the services received on a particular port, e.g. the port 53, to this new table, for example using the following Linux command for redirecting the DNS traffic: ip rule add dport 53 table 10

Thus the master node launches the network services on the new interface br0.service. The other nodes of the network will therefore find or re-find the access to these network services automatically.

When the master node loses its master role (for example when its network cable is disconnected), it must stop the central services on its interface br0.service, and it must deconfigure its interface br0.service as well as the associated routing rules.

The second IP address is an IP address reserved for configuring the network services and is advantageously decorrelated from the first IP address particular to the master node. Thus, when the master node is no longer accessible, e.g. because it is disconnected from the network, the other nodes of the communication network 1 can continue to use the network services, which function with their own IP address, in this case with the second IP address allocated by the DHCP server. This second IP address is not connected to the master node and can advantageously be transferred to another master node newly elected. Thus the newly elected master node is able to continue to offer the network services to the other nodes of the network, without intervention by a user.

FIG. 4 illustrates schematically a method for configuring a communication network 1 according to one embodiment. The method is implemented by a newly elected master node, referred to as the new master node, e.g. following a loss of connection between an old master node and the gateway.

This new master node may be a node already present in the communication network 1 when the latter was coordinated by the former master node or be a node newly connected to the communication network 1.

In an optional step S200, the new master node recovers the topology of the communication network 1 through exchanges of messages with the other nodes of the local network. The nodes exchange these messages using a communication bus, e.g. a bus P1905, or the ISM protocol described in the patent application FR2984554 published on 21 Jun. 2013. This step is optional since, in the case where the new master node had been connected to the communication network 1 for a certain amount of time, it already knows its topology. In the case where the new master node was not already connected to the communication network 1, it does not know this topology and must therefore recover it to be able to communicate with the other nodes of the communication network 1.

In a step S202, the new master node checks that it has available to it a virtual MAC address and an IP address associated with said virtual MAC address and reserved for configuring the network services.

In the case where it has such information available to it, the method continues at the step S210. This is because, if the new master node were already connected to the communication network 1 for a certain amount of time, it will have recovered this information (virtual MAC address and associated IP address) when it was first connected and it therefore already has them available to it.

Otherwise the method continues at the step S204.

In the step S204, the new master node asks the other nodes of the communication network 1 whether a virtual MAC address and an IP address reserved for configuring the network services are already allocated on the network. For example, the new master node exchanges messages on the communication bus with the other nodes. It may in particular broadcast a message that will be received by all the nodes of the network. In a variant embodiment, if it knows the topology of the network, it can send a unicast message to at least one node of the communication network 1.

In the case where a virtual MAC address and an IP address reserved for configuring the network services are already allocated on the network (S206), the method continues at the step S208.

At the step S208, the new master node receives, from the other nodes having knowledge of the configuration of the services, the virtual MAC address and the associated IP address. This IP address reserved for configuring the network services was able to be obtained in a step S102 by a node that was previously master and which is no longer so. Thus this IP address reserved for configuring the next network services is not connected to the master node that obtained it from the DHCP server and can be transmitted to a new master node. In a step S210, the new master node configures a virtual network interface from the information obtained. More precisely, the master node configures a virtual network interface possessing its own MAC address from the information obtained. This virtual interface is configured for hosting the network services, e.g. DNS, routing, etc. For example, the following Linux command is used for configuring this virtual interface:

ip link add link br0 name br0.service type macvlan where br0 is a bridge defined for connecting all the LAN interfaces to each other, and br0 service is the name of the virtual interface used for hosting the network services. Thus a link is created between br0 and the virtual interface br0.service. macvlan indicates that br0.service is a virtual interface based on an MAC address.

The virtual interface is next configured with the virtual MAC address and the second IP address, for example by means of the following Linux commands:

ifconfig br0.service hw ether <virtual mac address >
ip addr add <second IP address>dev br0.service Each node of the communication network. 1 has its own routing table that enables it to route the traffic, in this case network frames, to their destination.

Then the route of the bridge br0.service is inserted in a secondary routing table, the number of which is chosen arbitrarily. For example, the following Linux command is used:

ip route add <network br0.service>table 10. In this case, the secondary routing table bears the number 10.

Routing rules are next inserted for redirecting the traffic of the services received on a particular port, e.g. the port 53, to this new table, for example using the following Linux command for redirecting the DNS traffic: ip rule add dport 53 table 10

Thus the master node launches the network services on the new interface br0.service. The other nodes of the network will therefore find or re-find the access to these network services automatically. Each IP address being allocated for a limited time, the master node must be able to request an extension of the IP lease of the second IP address as provided for by the normative document RFC DHCP 2131. For this purpose, it starts up a DHCP client connected to the virtual interface in a step S212. For example, the following Linux command is used: dhcpclient-i br0.service.

In the case where a virtual MAC address and an IP address reserved for configuring the services are not already allocated on the network (S206), the method continues at the step S214.

In the step S214, the new master node obtains a virtual MAC address, which is generated from its base MAC address. The MAC address is said to be virtual since it is not a base MAC address identifying a network device as soon as it was manufactured in the factory but an address generated from a base MAC address. For example, the virtual MAC address is obtained by incrementing the base MAC address by a value v, e.g. v=1. In a variant embodiment, the virtual MAC address is obtained by positioning a private bit of the MAC address at a predefined value, e.g. the value 1. Such a private bit is defined in the document RFC 1649

In a step S216, the new master node configures a virtual network interface with said virtual MAC address. This virtual interface is configured for hosting the network services, e.g. DNS, routing, etc. For example, the following Linux command is used for configuring this virtual interface:

ip link add link br0 name br0. service type macvlan where br0 is a bridge defined for connecting all the LAN interfaces to each other, and br0.service is the name of the virtual interface used for hosting the network services. Thus a link is created between br0 and the virtual interface br0.service. macvlan indicates that br0.service is a virtual interface based on a MAC address.

The virtual interface is next configured with the virtual MAC address, for example by means of the following Linux command:

ifconfig br0.service hw ether <virtual mac address >

In a step S218, the new master node starts up a DHCP client connected to the virtual interface. For example, the following Linux command is used: dhcpclient-i br0.service.

In a step S220, the new master node obtains, by means of the DHCP client, a second IP address that is associated with said virtual MAC address, said IP address being reserved for configuring the network services. To obtain the second IP address, the master node broadcasts a request of the DHCPDISCOVER type for locating a server of the DHCP type. The request of the DHCPDISCOVER type comprises the virtual MAC address of the node. For example, the virtual MAC address is inserted in a field chaddr of the request. In a variant, the virtual MAC address is inserted in an optional field of the request known by the English terminology Client Identifier. This field is in particular defined in the normative document RFC 1541. In a variant embodiment, the field Client Identifier is based on the virtual MAC address without being equal to said virtual MAC address. In another variant embodiment, the field Client Identifier comprises the serial number. The DHCP server receives the message DHCPDISCOVER. Thinking that a new node the base MAC address of which is the virtual MAC address is generated is involved, it sends a response of the DHCPOFFER type, i.e. an IP lease offer, which comprises in particular the IP address of the DHCP server, as well as the second IP address that it is offering to the master node. This second IP address is different from the first IP address. In general, the master node will then send a message DHCPREQUEST by which it selects an IP lease offer. The message DHCPREQUEST comprises the identification of the DHCP server selected. The DHCP server selected sends an acknowledgement message DHCPACK, which can in particular contain the address of a DNS (the English acronym of "Domain Name System") server.

In a step S222, the new master node configures the virtual interface with the second IP address, for example by means of the following Linux command:

ip addr add <second IP address>dev br0.service

Each node of the communication network 1 has its own routing table that enables it to route the traffic, in this case network frames, to their destination.

Then the route of the bridge br0.service is inserted in a secondary routing table, the number of which is selected randomly. For example, the following Linux command is used:

ip route add <network br0.service>table 10. In this case, the secondary routing table bears the number 10.

Routing rules are next inserted for redirecting the traffic of the services received on a particular port, e.g. the port 53, to this new table, for example using the following Linux command for redirecting the DNS traffic: ip rule add dport 53 table 10

Thus the master node launches the network services on the new interface br0.service. The other nodes of the network will therefore find or re-find the access to these network services automatically.

In a step S224, the new master node broadcasts the virtual MAC address as well as the second IP address to all the other nodes of the communication network 1, including the terminals. In a variant embodiment, the virtual MAC address, the second associated IP address and the value of the field Client Identifier if it is different from the virtual MAC address, are broadcast by the master node to all the other nodes of the communication network 1. This step corresponds to the step S104 of FIG. 3.

The invention claimed is:

1. A method of configuring a communication network comprising a gateway adapted to interconnect said communication network to a wide area communication network, said gateway being connected to a plurality of nodes implementing an access point functionality of a wireless local area network, said plurality of nodes including a current master node selected from said plurality of nodes, said current master node being configured to define the configuration of the communication network, said method causes a master node of the plurality of nodes to perform:
   obtaining a first IP address associated with a base MAC address of said master node; and
   after said master node being elected as the current master node:
      obtaining a virtual MAC address and a second IP address associated with said virtual MAC address, said second IP address being reserved for network services configuration and being different from and decorrelated from said first IP address; and
      configuring a virtual network interface to host network services with said second IP address associated with said virtual MAC address;
   wherein, when said virtual MAC address and said second IP address are already allocated on the communication network, obtaining the virtual MAC address and the second IP address associated with said virtual MAC address comprises:
      obtaining said virtual MAC address and said second IP address associated with said virtual MAC address from said master node if said virtual MAC address and said second IP address are already available to said master node, else
      receiving said virtual MAC address and said second IP address associated with said virtual MAC address from another node in the communication network.

2. The method according to claim 1, wherein, when said virtual MAC address and said second IP address associated with said virtual MAC address are not allocated on the communication network, obtaining the virtual MAC address and the second IP address associated with said virtual MAC address comprises:
   generating a virtual MAC address from said base MAC address of said master node;
   configuring the virtual network interface with said virtual MAC address;
   starting a DHCP client connected to the virtual network interface; and
   obtaining, via the DHCP client, an IP address from a DHCP server, said obtained IP address being said second IP address being reserved for network services configuration.

3. The method according to claim 2, wherein the value of the virtual MAC address is equal to the value of the base MAC address of said master node incremented by v, v being a positive integer.

4. The method of claim 1, wherein receiving said virtual MAC address and said second IP address from another node in the communication network comprises obtaining said second IP address from a DHCP server by another master node different from said current master node, wherein said virtual MAC address received from the other node of the communication network has been generated from a base MAC address of said other master node, and wherein configuring the virtual network interface to host network services with said second IP address associated with said virtual MAC address comprises:
   configuring said virtual network interface with said virtual MAC address and with said second IP address associated with said virtual MAC address; and
   starting a DHCP client connected to the virtual network interface.

5. The method according to claim 1, wherein configuring the virtual network interface with said second IP address associated with said virtual MAC address comprises creating a secondary routing table and using said secondary routing table for redirecting traffic of the network services.

6. A non-transitory storage medium storing a computer program comprising instructions for implementing the configuration method according to claim 1, when the program is executed by a processor.

7. A master node of a communication network comprising a gateway adapted to interconnect the communication network to a wide area communication network, said gateway being connected to a plurality of nodes implementing an access point functionality of a wireless local area network, said plurality of nodes comprising a current master node whereby the current master node is selected from said plurality of nodes, said current master node being configured to define the configuration of the communication network, said master node being one of the plurality of nodes and comprising electronic circuitry configured to:
   obtain a first IP address associated with a base MAC address of said master node; and
   after said master node being elected as the current master node:
      obtain a virtual MAC address and a second IP address associated with said virtual MAC address, said second IP address being reserved for network services configuration and being different from and decorrelated from said first IP address; and
      configure a virtual network interface to host network services with said second IP address associated with said virtual MAC address;
   wherein, when said virtual MAC address and said second IP address are already allocated on the communication network, obtaining the virtual MAC address and the second IP address associated with said virtual MAC address comprises:
      obtaining said virtual MAC address and said second IP address associated with said virtual MAC address from said master node if said virtual MAC address and said second IP address are already available to said master node, else
      receiving said virtual MAC address and said second IP address associated with said virtual MAC address from another node in the communication network.

* * * * *